(12) United States Patent
Sobek et al.

(10) Patent No.: US 6,935,192 B2
(45) Date of Patent: Aug. 30, 2005

(54) MICROFLUIDIC BULK FLOW DETERMINATIONS BASED ON CONVERTING HEAT TRACER MEASUREMENTS

(75) Inventors: Daniel Sobek, Portola Valley, CA (US); Hongfeng Yin, Cupertino, CA (US); Roy D. Rocklin, Sunnyvale, CA (US); Kevin Killeen, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/675,037

(22) Filed: Sep. 30, 2003

(65) Prior Publication Data

US 2005/0066747 A1 Mar. 31, 2005

(51) Int. Cl.[7] ................................................. G01P 5/06
(52) U.S. Cl. .................................................. 73/861.95
(58) Field of Search ........................... 73/861.95, 861.07

(56) References Cited

U.S. PATENT DOCUMENTS 6,386,050 B1 * 5/2002 Yin et al. ................. 73/861.95
6,645,428 B1 * 11/2003 Morris et al. ................. 422/15

FOREIGN PATENT DOCUMENTS

WO    WO 01/90700 A2    5/2001

OTHER PUBLICATIONS

Kurzweg, U.H., et al., "Flow Rate Determination in Conduits Using a Thermal Pulse Technique," Int. Comm. Heat Mass Transfer, vol. 24, No. 2, pp. 211–221, 1997.
Kurzweg, U.H., et al., "Thermal Pulse Propagation and Dispersion in Laminar Flow Within Conduits of Finite Wall Conductivity," Int. J. Heat Mass Transfer, vol. 40, No. 6, pp. 1391–1400, 1997.

* cited by examiner

*Primary Examiner*—Edward Lefkowitz
*Assistant Examiner*—Jewel V. Thompson

(57) ABSTRACT

The fluid flow rate within a microfluidic passageway of a microfabricated device is determined by measuring the time-of-flight of a heat pulse coupled into the fluid. Since the propagation velocity of the heat trace is generally slower than the mean flow rate of the flow, additional processing provides the appropriate scaling needed to obtain an accurate fluid flow rate measurement. The scaling factor is based on the geometry of the structure and the thermal properties of the fluid and the materials used for the device.

24 Claims, 9 Drawing Sheets

MICROFLUIDIC BULK FLOW DETERMINATIONS BASED ON CONVERTING HEAT TRACER MEASUREMENTS

TECHNICAL FIELD

The invention relates generally to methods and systems for determining fluid flow and more particularly to measuring flow rates within a microfluidic passageway.

BACKGROUND ART

Microfluidic technology is used in systems that perform chemical and biological analysis, as well as chemical synthesis, on a much smaller scale than previous laboratory equipment and techniques. Microfluidic systems offer the advantages of only requiring a small sample of analyte or reagent for analysis or synthesis, and dispensing a smaller amount of waste materials. A microfluidic system may be a single component or part of a larger system. For example, the system may include interface elements such as an electrospray ionization tip, which would allow the system to be interfaced to a mass spectrometer. The term "microfluidic" as used herein refers to features that are fabricated on the micron or submicron scale. For example, a typical channel or chamber of a microfluidic system has at least one cross-sectional dimension in the range of approximately 0.1 microns to 1000 microns.

As microfluidic systems increase in complexity, the importance of reliable electronic and software processing support to enhance the analysis capabilities also increases. Known microfluidic systems provide processing support for performing operations such as measuring the flow rate of fluid through a system passageway. An accurate determination of flow rate is important in a number of different applications, such as in HPLC (High Performance Liquid Chromatography) coupled to mass-spectrometer analysis.

U.S. Pat. No. 6,386,050 to Yin et al. describes a system and method for measuring flow rate within a fluid-bearing passageway of a microfluidic system. Heat tracers (i.e., thermal fluctuations) are introduced into the flow, so that passage to an interrogation region may be detected and timed. The heat tracers may be introduced using an optical heat generator or an electrical element, such as a heating resistor. Optical or electrical properties of the fluid may be monitored to detect passage of heat tracers into the interrogation region. The Yin et al. patent teaches that the flow rate is based directly upon calculating the speed of a heat tracer.

A number of other systems for measuring flow rates are described in the Yin et al. patent. For example, in the described system of U.S. Pat. No. 4,938,079 to Goldberg, intrusive monitoring is used. In the Goldberg system, the heat tracer is introduced into the flow of liquid by a microwave heating device or a source of focused infrared energy. The flow rate is measured by determining the transit time of the heat tracer from its source to a sensor. As one possibility, the dielectric constant of the liquid is monitored to detect changes in temperature. The Goldberg system is designed to provide accuracy at flow rates of less than 100 cc/hour. U.S. Pat. No. 5,726,357 to Manaka and U.S. Pat. No. 5,623,097 to Horiguchi et al. also describe microfabricated devices which employ thermal approaches to calculating flow rates.

While the known approaches to calculating flow rates based on measuring the time interval required for a heat tracer to travel a particular distance provide useful information, more accurate calculations are sought.

SUMMARY OF THE INVENTION

In a microfabricated device, the on-chip fluid flow rate is calculated by incorporating an adjustment that is specific to the scaling between a bulk fluid flow rate and a propagation rate of a heat tracer introduced into a particular microfluidic passageway. Thus, a chip-based microfluidic device may include a heat generator coupled to introduce the heat tracer into a flow of fluid through the passageway, a detector positioned to detect temperature-dependent variations of the fluid within an interrogation region of the passageway, and a processor that is configured to determine the transit time of the heat tracer through the passageway and to determine the bulk fluid flow rate on the basis of the transit time and a pre-identified scaling between heat tracer propagation rates and bulk fluid flow rates of the microfluidic passageway.

In accordance with the method, the heat tracer is introduced into the fluid flowing through the microfluidic passageway of the microfabricated device. A temperature-dependent condition of the fluid is monitored during passage through the interrogation region. On the basis of the monitoring, the arrival of the heat tracer within the interrogation region is detected. The bulk flow rate of the fluid through the passageway is then calculated using the heat tracer transit time and the pre-identified scaling between the propagation rate of the heat tracer and the bulk fluid flow rate. In order to enhance the accuracy and/or the dynamic range of flow rate measurements, a series of microfluidic features (e.g., sensing electrodes) may be formed along the microfluidic passageway at increasing distances from the source of the heat tracer, so that repetitive measurements can be acquired for a single heat tracer.

The scaling in the two rates is a function of the properties of the fluid and the properties of the structure directly related to forming the microfluidic passageway. The relevant properties include the heat capacities of the fluid and the structure, as well as the geometry of the structure which forms the passageway. The propagation rate of the heat tracer will be less than the flow rate of the fluid. The calculation of the appropriate scaling factor may include determining the product of the ratio of the two heat capacities times the ratio of a cross-sectional dimension of the microfluidic passageway to the cross-sectional dimension of the structure that forms the passageway. For example, the second ratio may be the half width of the passageway to the half width of the passageway-forming structure.

In application, the heat capacity of the passageway-forming structure and the relevant dimensions of the structure are known and fixed. Therefore, only the heat capacity of the fluid varies, where the heat capacity is a function of the specific heat and the density of the fluid. In one embodiment, the conversion from the propagation rate information of the heat tracer to the bulk fluid flow rate is determined algorithmically. As an alternative, the conversion is performed by applying a calibration curve which implements an upward adjustment to the bulk fluid flow rate.

The heat generator for introducing the heat tracers and the detector for monitoring the temperature-dependent variations in the fluid may be integrated onto the same substrate on which the passageway and other microfluidic features are microfabricated. The microfluidic features may include micromachined components, such as valves. Moreover, the processor and the storage of the passageway data and fluid data necessary for the conversion may be integrated onto the same substrate as the microfluidic features. Tracer generation may be optically based or electrically based. Similarly, tracer detection may be performed electrically or optically.

DETAILED DESCRIPTION

Figure 1:
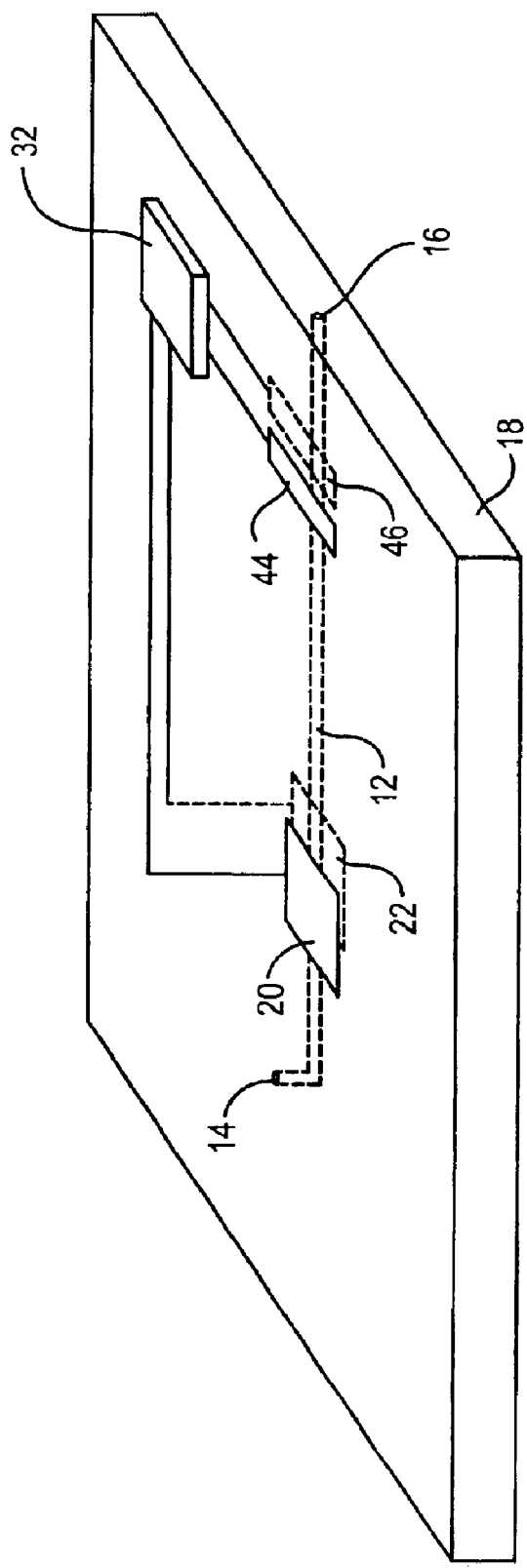
FIG. 1 is a perspective view of an example of a microfabricated system having a flow rate conversion capability in accordance with the invention.

With reference to FIG. 1, a microfabricated device 10 is shown as being simplified to a single microfluidic feature, namely a microfluidic passageway 12 having an inlet 14 and an outlet 16. In a more complex embodiment, the substrate 18 in which the passageway 12 is fabricated includes an interconnection of microfluidic features, such as transfer channels, separation channels, mixing channels, and microfluidic compartments which may be used for fluid treatment and analysis. The fluid treatments may include, but are not limited to, mixing, labeling, filtering, extracting, precipitating, digesting, and the like. The substrate 18 may also include microfluidic flow control elements such as mixers, valves, pumps, pressure regulators and mass flow regulators.

The microfabricated device 10 may be formed by direct means, such as photolithographic processing, wet or dry chemical etching, laser ablation, or traditional machining. The device 10 may also be fabricated by indirect means, such as injection molding, hot embossing, casting, or other processes that utilize a mold or patterned tool to form the microfluidic features.

The substrate 18 may be formed of a polymer, glass, silicon or ceramic material. Polymers offer advantages, with polyimide being particularly well suited. A polymer may be selected from the following classes, polyimide, PM MA, polycarbonate, polystyrene, polyester, polyamide, polyether, polyolefin, and mixtures thereof.

As previously defined, the term "microfluidic" refers to a component or feature associated with channels or chambers that are generally fabricated on the micron or submicron scale. For example, the microfluidic passageway 12 of FIG. 1 may have a cross-sectional dimension in the range of 0.1 microns to approximately 500 microns. While the inlet 14 and the outlet 16 create the impression that the passageway is circular, conventional fabrication techniques result in non-circular passageways.

Figure 3:
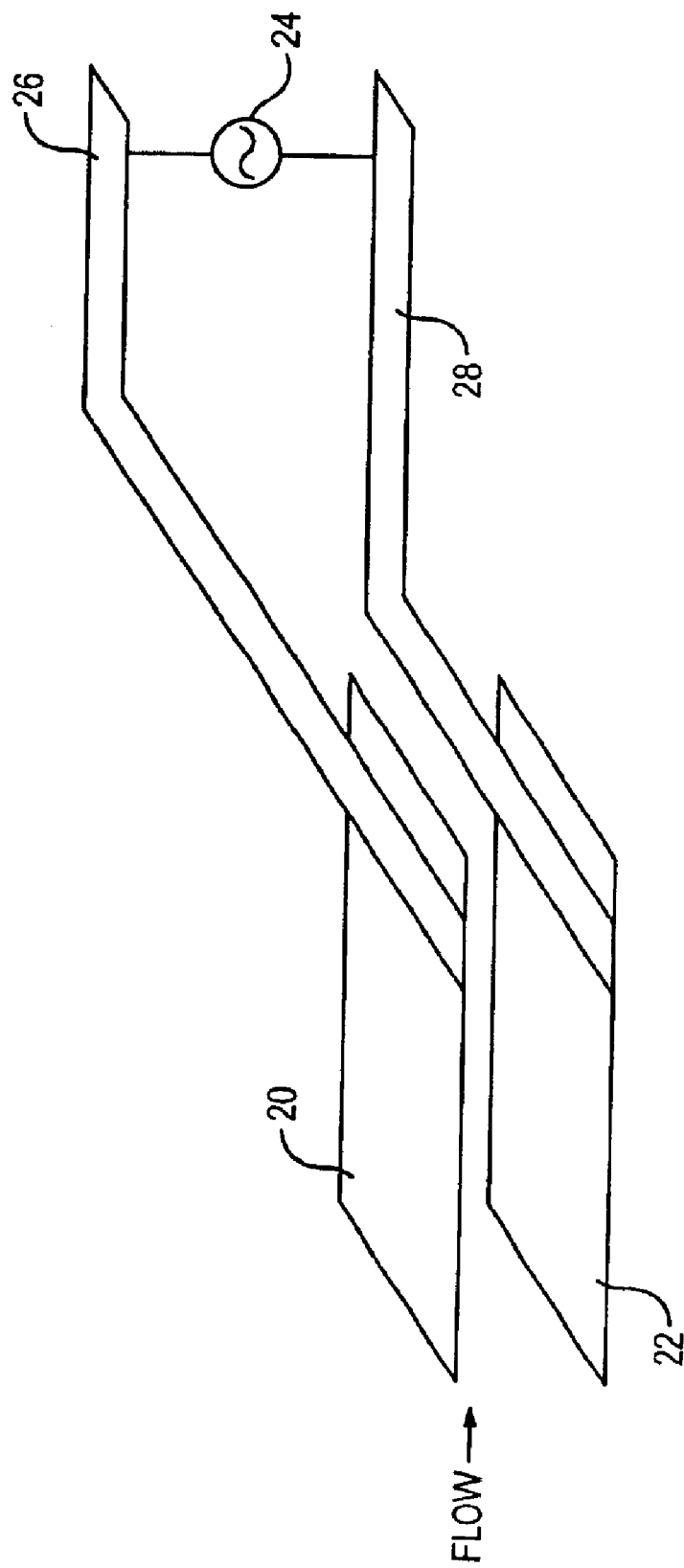
FIG. 3 is a schematic representation of one possible implementation of a heat generator for introducing a heat tracer into a microfluidic passageway of the system of FIG. 1.

The microfluidic passageway 12 of FIG. 1 is shown as dashed lines, since the passageway is formed in the interior of the multi-layer substrate 18. At an upstream side of the passageway is a pair of electrodes 20 and 22 on opposite sides of the passageway. Referring briefly to FIG. 3, the electrodes may be thin metallic films that are patterned during the fabrication of the microfluidic system. The electrodes are connected to a source 24 of alternating current by traces 26 and 28. While the source 24 is shown as applying a sine wave, square wave activation or other current fluctuations may be substituted.

Figure 2:
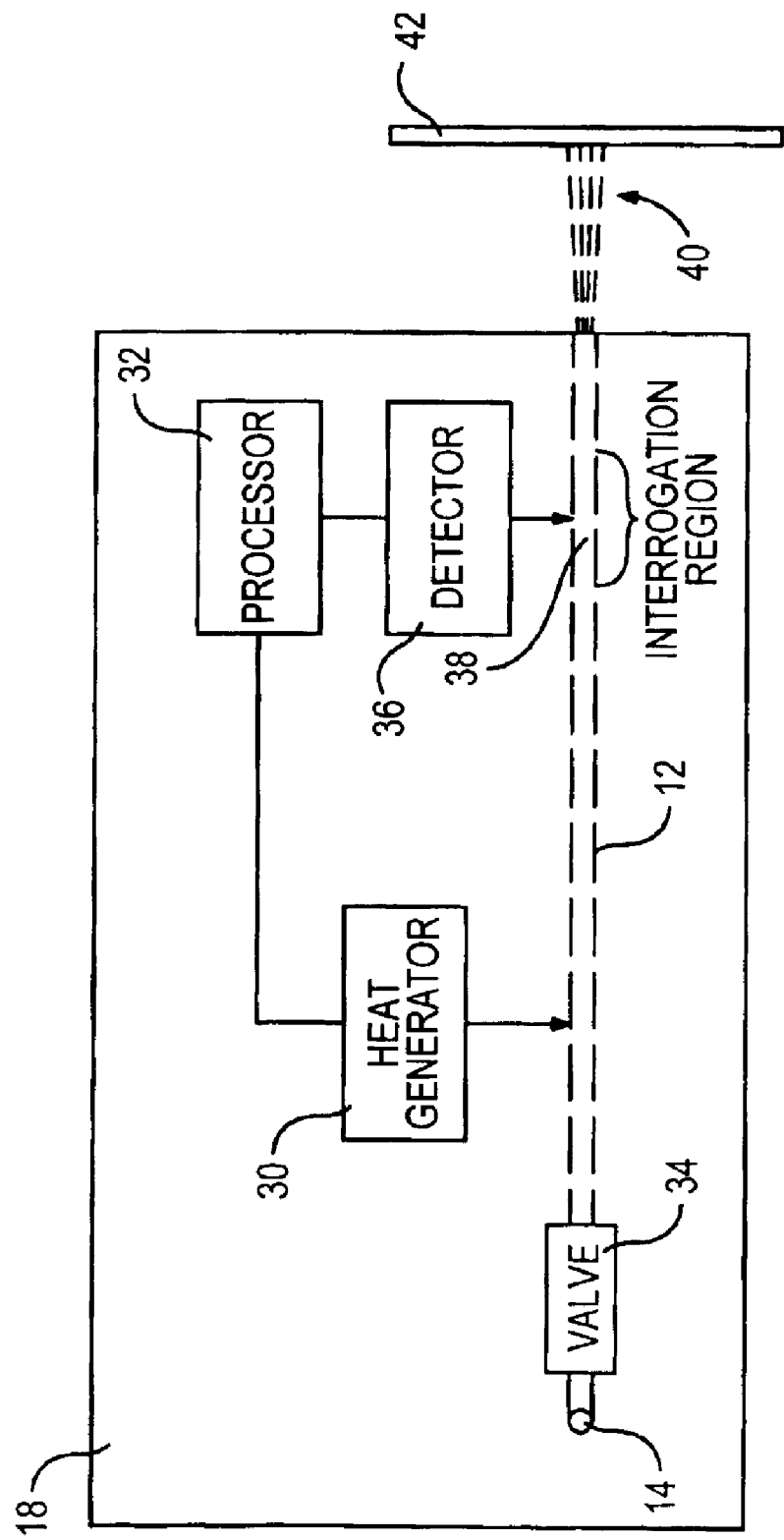
FIG. 2 is a schematic representation of on-chip components of the system of FIG. 1.

In FIG. 2, the mechanism for introducing the heat tracers into the microfluidic passageway 12 is identified broadly as a "heat generator" 30. The heat generator may include a controller that receives control signals from a processor 32, such as a microprocessor bonded to the substrate 18. The controller may include transistors or other electronic components which are integrated with other elements of the microfluidic system during fabrication. That is, the electronic components may be formed using photolithography or other integrated circuit fabrication techniques. However, a less complex embodiment utilizes bonding techniques, such as flip-chip bonding, to connect the processor 32 and any other electronic components to the system. As another possibility, the operations performed by the electronic components may be provided off-chip, so that only electrical connections to the substrate 18 are required.

As an alternative to the use of the electrodes 20 and 22 and the AC source 24 of FIG. 3, the heat generator 30 may be a serpentine pattern of traces through which direct current is conducted to generate heat in the area adjacent to the microfluidic passageway 12. Microfabricated heaters are well known in the art. While there are benefits to providing contactless conduction of heat to the fluid within the passageway, the heat generator 30 may use an approach in which the heated element, such as a heating resistor, is in direct contact with the fluid.

The thermal energy that is introduced to the fluid within the microfluidic passageway 12 by the heat generator 30 should be sufficiently great that the change in temperature of the fluid is perceivable using techniques to be described below. However, the increase in temperature should not degrade the chemical composition of the fluid. Optionally, the system may include a feedback loop to the controller of the heat generator 30 in order to provide active temperature control. The same concerns are applicable if the electrical heating is replaced with optical heating, such as the use of a lamp or laser having a wavelength that is absorbed by the fluid within the passageway.

As previously noted, the processor 32 may be a prefabricated component that is bonded to the substrate 18. The processor contains software and/or firmware that, through its operations, guides or controls the actions of the integrated circuitry. For example, the processor may contain programmable logic that allows a programmed algorithm to be executed so as to perform certain functions, including the conversion from a heat tracer propagation rate to a bulk fluid flow rate. Bonding the processor can involve utilizing contact solder to connect corresponding electrical contact points on the processor and the substrate 18. The contact solder may be tailored to the maximum temperature that will be withstood by the microfluidic processing. While not shown, the processor or the substrate may include contact pads that are used to connect the system to remote (i.e., off-system) devices or systems.

The substrate 18 may also include micromachined components, such as the valve 34. Techniques for micromachining valves and other mechanical devices onto a substrate are known, particularly if the substrate is formed of a semiconductor material.

A detector 36 is aligned with an interrogation region 38 of the microfluidic passageway 12. Prior to activation of the heat generator 30, the fluid within the passageway will have a particular level of conductivity. The conductivity will depend upon the ionic species that are constituent to the fluid, upon the electrolyte that is used, and upon the temperature of the fluid. The detector monitors the condition of the fluid flowing through the interrogation region, so that changes that are induced as a consequence of activations of the heat generator are detected. This approach can be used in any application in which there is a movement of the fluid (as compared to applications in which separations of constituents do not require bulk fluid movement, e.g., electrophoresis). The approach is particularly well suited for chromatographic separations and to the accurate dispensing and general manipulation of liquids.

In some applications, the microfabricated system is used for on-chip analysis, for example, separations based on sample hydrophobicity, charge, chirality, or affinity to a specific compound. In other applications, additional analysis may be performed following the release of the fluid from the substrate 18, such as schematically represented by the electrospray 40 in the direction of a charge plate 42. As one example, the on-chip components may implement an HPLC separation of the sample, and the electrospray may soft-ionize the sample for introduction into a mass spectrometer.

In an optical embodiment of the detector 36, a mirror may be placed on a side of the microfluidic passageway 12 opposite to a non-thermal optical source such as a laser. Prior to heating of the fluid by the heat generator 30, the light from the non-thermal laser will undergo a degree of refraction upon entering and exiting the passageway. Thus, the axis of the light that reaches the detector will have a first angle relative to the axis of the light as it approaches the passageway. The detector may be a position-sensitive detector, such as a charged coupled device (CCD). On the other hand, when a heat tracer reaches the interrogation region 38 of the passageway, the refractive index will change and light that reaches the CCD will have a second angle that is different from the normal state (i.e., unheated state) of the fluid.

Rather than monitoring the refractive index of the fluid in order to determine when a heat tracer reaches the interrogation region 38, the conductivity of the fluid can be monitored. FIG. 1 shows a two-electrode embodiment of the conductivity monitoring. In this embodiment, electrodes 44 and 46 are fabricated on opposite sides of the microfluidic passageway 12. Four-electrode embodiments may also be used, as described in U.S. Pat. No. 6,386,050 to Yin et al. A voltage generator, such as an AC source, is connected to two of the electrodes. The frequency of the voltage generator may be one megahertz, but other frequencies may be used. The generator provides signals that are 180 degrees out of phase. The electrodes may be conductive traces on the substrate 18. At least one capacitive cell is formed. Since the electrical conductivity of the fluid within the passageway will affect the capacitive cell, the conductivity can be monitored by appropriately connected sense circuitry. The electrical conductivity of the fluid will vary with temperature, so that arrival of a heat tracer at the interrogation region is detectable.

As opposed to the planar electrodes 44 and 46 represented in FIG. 1, the electrodes may be rings that are formed at the interrogation region. The rings are spaced apart and the electrical conductivity of the fluid between the rings is monitored. Similarly, co-planar electrodes that are spaced apart along the direction of fluid flow may be used to monitor electrical conductivity within the region between the electrodes.

While only a single interrogation region is shown in FIGS. 1 and 2, more reliable flow rate information may be possible using multiple interrogation regions. For example, rather than determining a heat tracer transit time as the time between activating the heat generator 30 and detecting the temperature-dependent fluctuation within the interrogation region 38, transit time may be measured as the time required for a previously introduced heat tracer to pass from an upstream interrogation region to a downstream interrogation region. Accuracy may be further enhanced by forming a series of electrodes (or other sensing features) at increasing distances from the source of the heat tracers. As a consequence, repetitive measurements may be acquired for each heat tracer, allowing a greater dynamic range in flow rate measuring as compared to using a single electrode at a fixed position from the source of the heat tracer.

Figure 4:
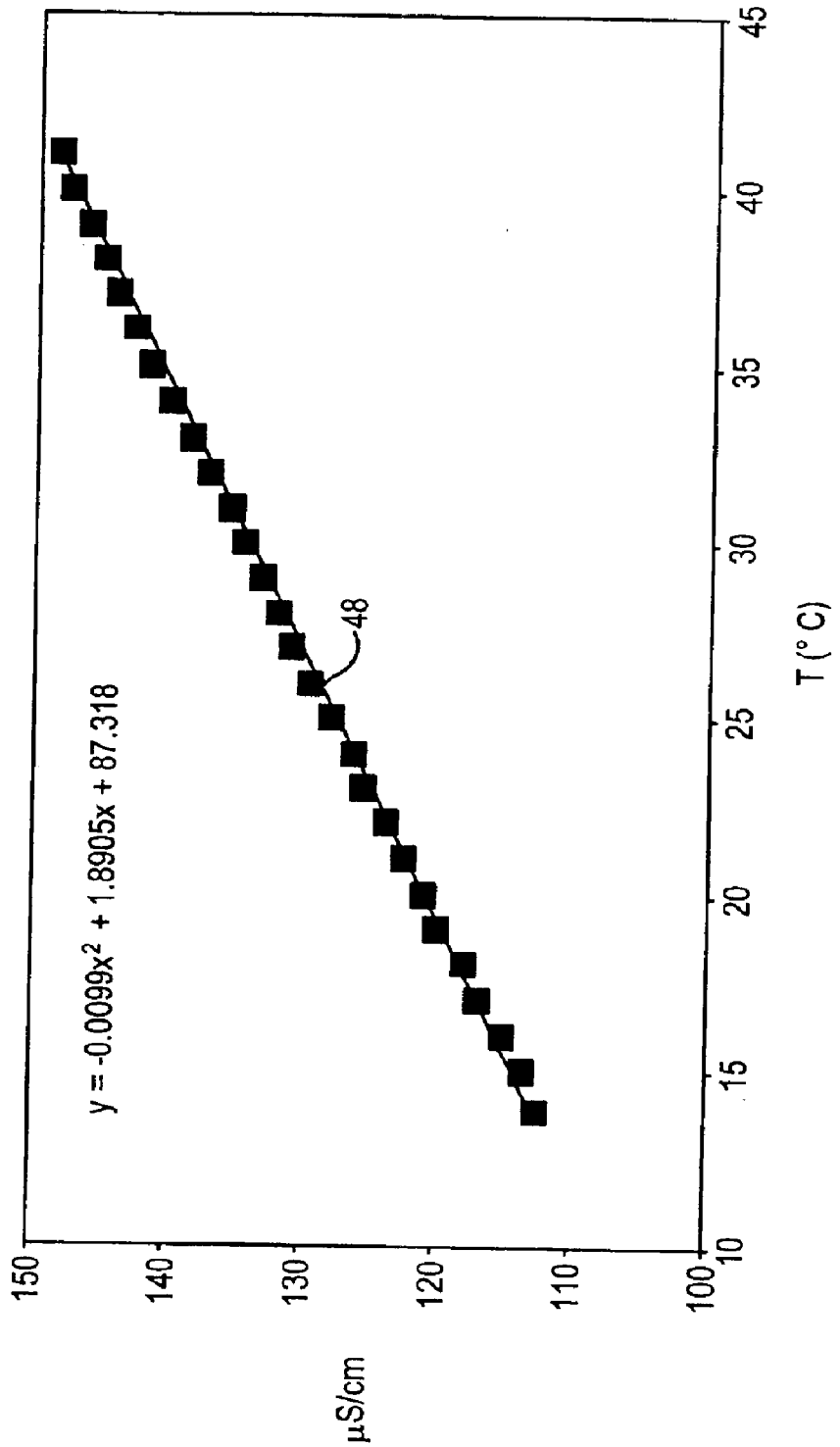
FIGS. 4 and 5 are graphs of the conductivity of fluids as a function of temperature.
Figure 5:
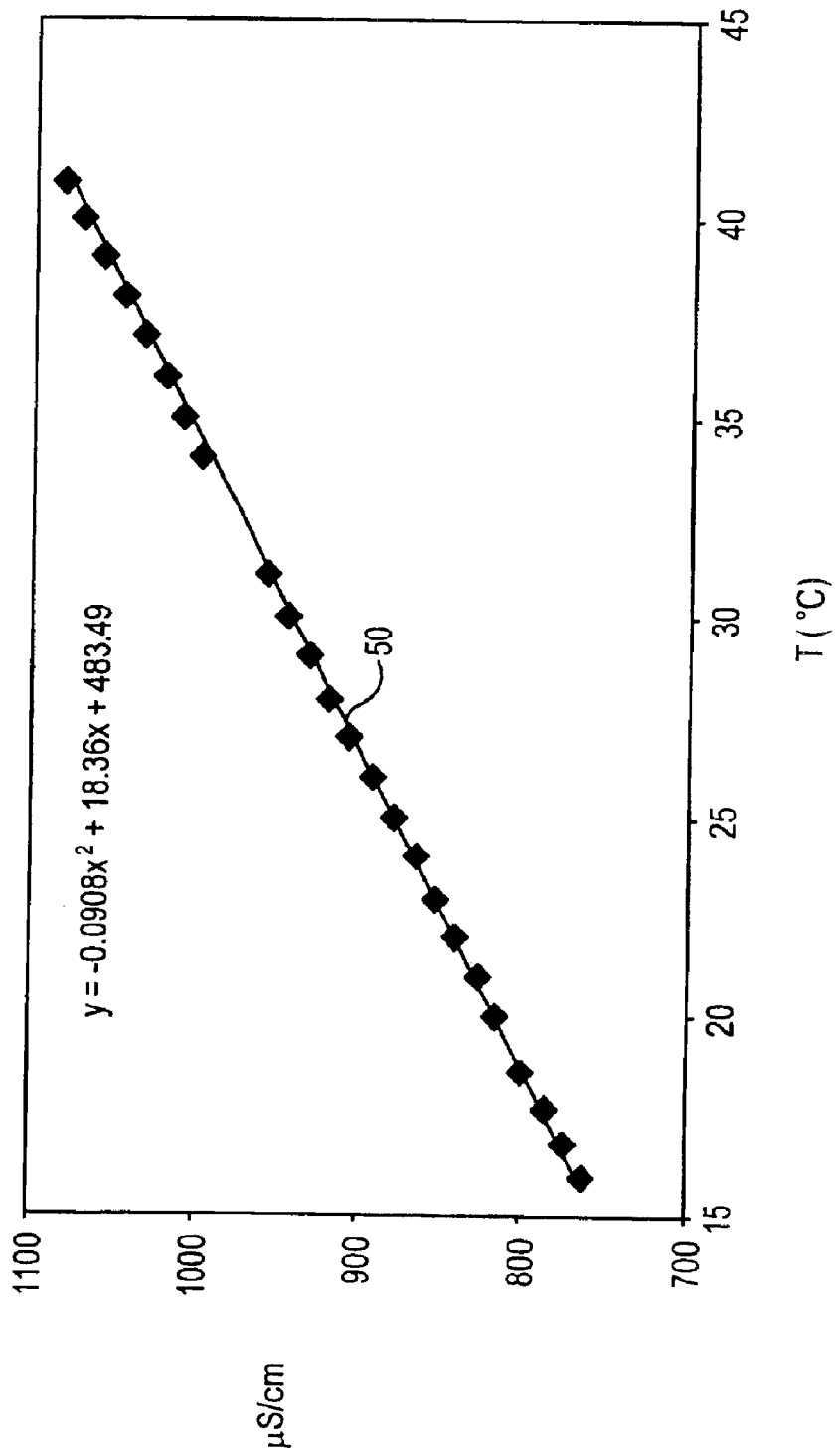

In practice, the distance over which the heat tracer travels in determining the transit time may be 10 millimeters (mm). A heat tracer may be introduced by activating a heater with a heat pulse of between one and two volts DC at a current between 0.35 and 0.7 amperes. The approach of detecting temperature-dependent variations within the interrogation region 38 may be conductivity based, rather than optically based, such as by detecting in-phase current using a lock-in amplifier. FIG. 4 is a plot 48 of the electrical conductivity of a solution of 0.1 percent Formic Acid in 50 percent Acetonitrile ($CH_3CN$) as a function of temperature. The conductivity is represented in standardized units ($\mu S/cm$), with the conductivity increasing as the temperature rises from 14 degrees Celsius to 41 degrees Celsius. Similarly, FIG. 5 is a plot 50 of the electrical conductivity of a solution of 0.1 percent Formic Acid in water. Again, conductivity increases with temperature.

Figure 6:
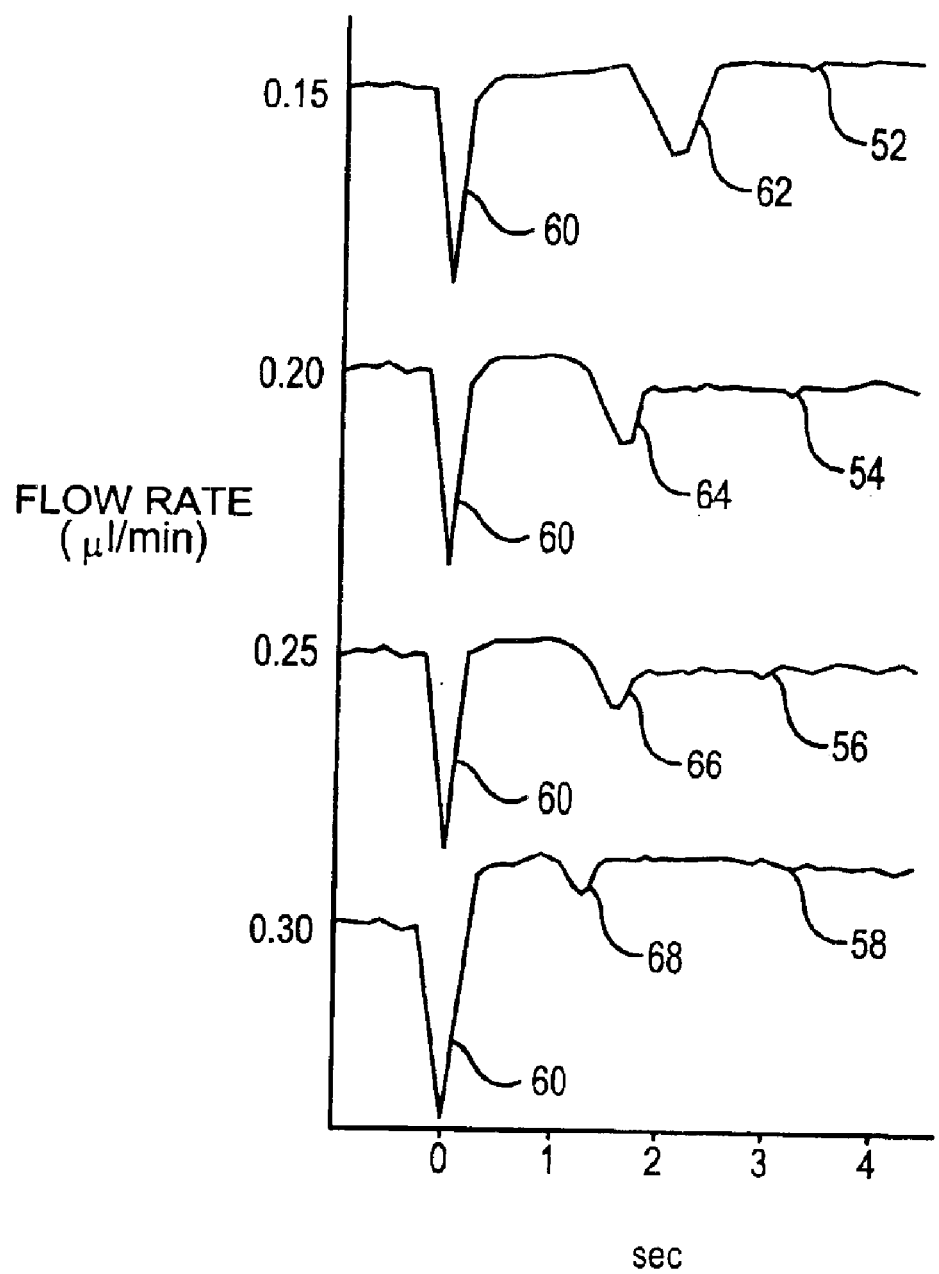
FIG. 6 illustrates transit times of heat tracers at different flow rates.

On-chip mobile phase linear velocity measurements were acquired or a solution having a mobile phase of 0.1 percent Formic Acid and 25 percent Acetonitrile. FIG. 6 shows information for determining four different transit times for four pump flow rates, which are measured in microliters per minute ($\mu L/min$). In each of four instances 52, 54, 56 and 58, the application of a heat pulse is marked by a baseline offset 60 at the initiation time. The Y axis is not set to scale in FIG. 6. Conductivity is monitored within the interrogation region and remains substantially at the baseline until a baseline change 62, 64, 66 and 68 occurs. The conventional (prior art) technique is to calculate the on-chip fluid flow rate as a direct correlation to the transit time of the heat tracer.

Figure 7:
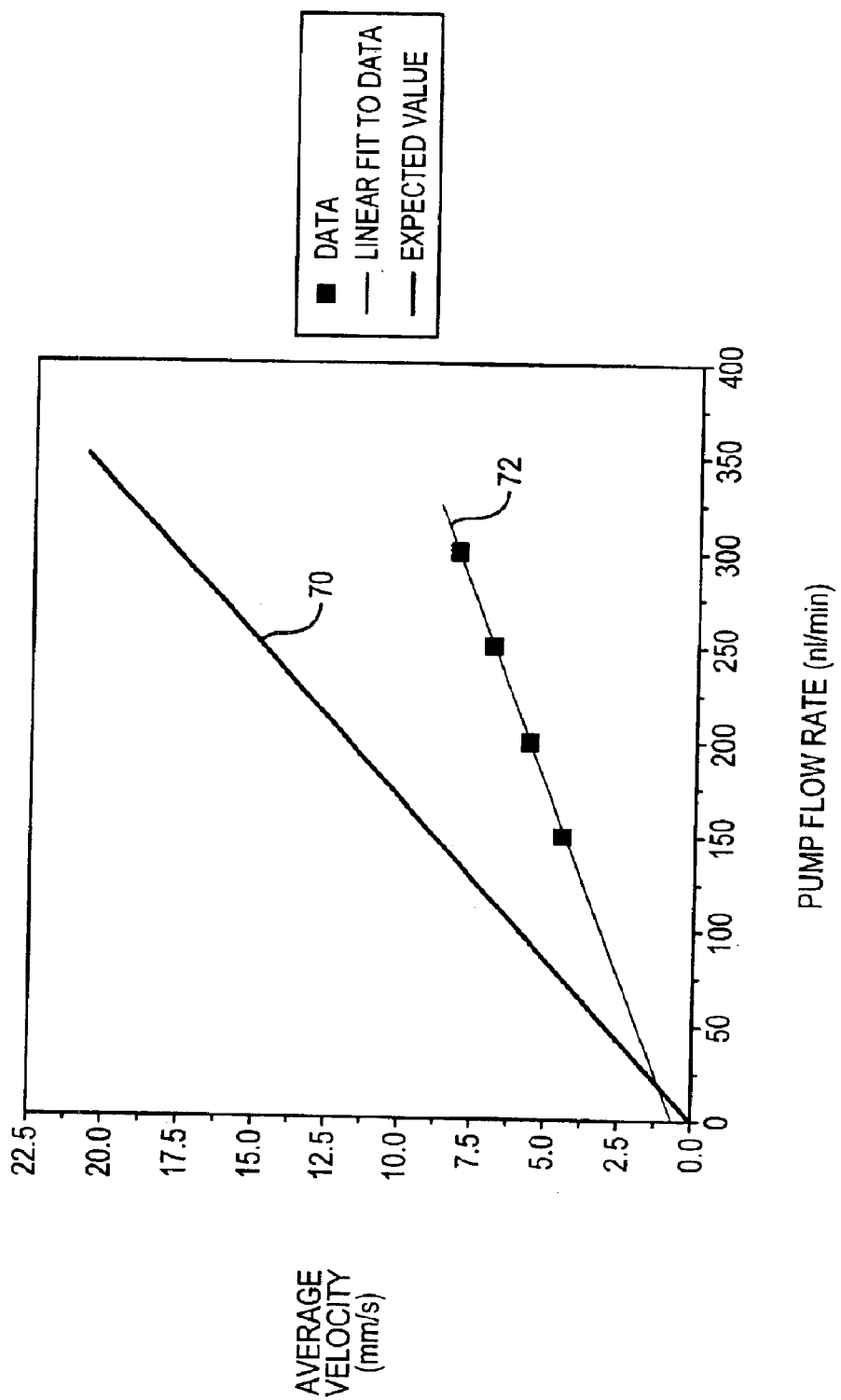
FIG. 7 is an illustration comparing the expected bulk fluid flow rate to the actual bulk fluid flow rate.
Figure 8:
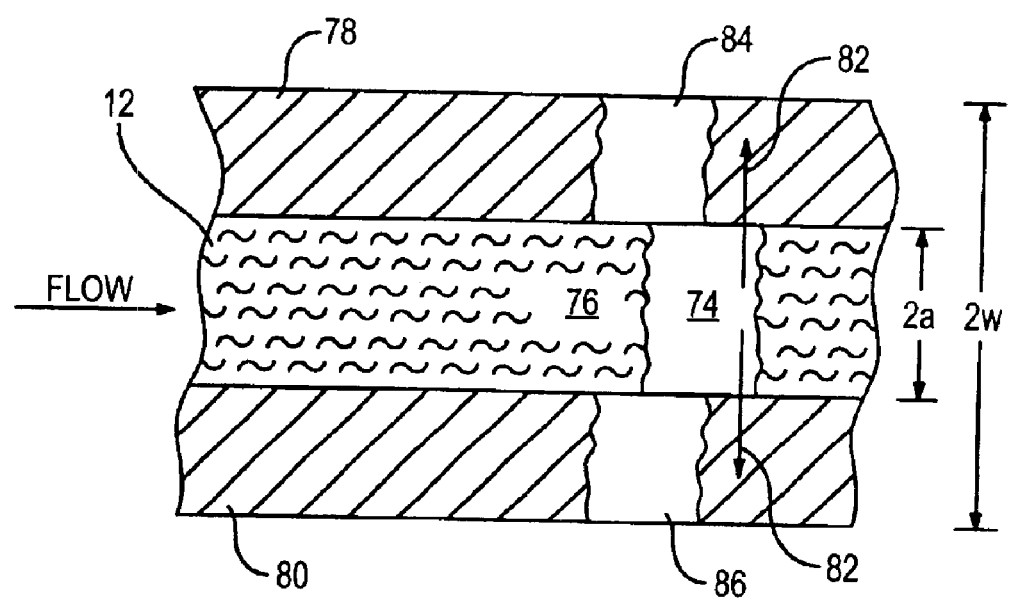
FIG. 8 is a sectional view of a microfluidic passageway of FIG. 1.

In FIG. 7, a graph 70 of the expected velocity value as a function of flow rate is shown. However, FIG. 7 also includes four plotted values of measured flow rate velocity as a function of the pump flow rate. The four measured values are connected by a linear fit line 72, so as to better illustrate the difference between expected velocities and actual velocities. It has been determined that there is a linear scaling between the propagation rate of a heat tracer and the bulk fluid flow rate. The cause of the lag of the heat tracer propagation rate is represented in FIG. 8. A thermally generated heat tracer 74 within a fluid 76 exchanges thermal energy with the walls 78 and 80 that form the microfluidic passageway 12. The exchange of thermal energy is represented by the arrows 82. As a consequence of the exchange, the walls 78 and 80 will include heated regions 84 and 86. While the bulk fluid flow rate is not affected, the flow rate of the heat tracer 74 will be reduced by the thermal exchange. The degree of effect is a function of the heat capacities of the fluid and the walls, as well as the geometries of the passageway and walls. Specifically, the propagation rate of the heat tracer 74 is a function of $$f = \frac{1}{1 + \frac{w}{a}\frac{\rho_w c_{pw}}{\rho_f c_{pf}}}$$

where $\rho_w$ is the density of the wall, $\rho_f$ is the density of the fluid, $c_{pw}$ is the specific heat of the wall, $c_{pf}$ is the specific heat of the fluid, a is the inside radius (or half width) of the microfluidic passageway 12, and w is the outside radius (or half width) of the structure that forms the microfluidic passageway. This equation is generally accurate for two-dimensional considerations. Scaling factors for a three-dimensional application can be calculated through numerical calculations for the heat transfer.

As an example of the use of the equation, f will be equal to approximately 0.35 if w=50 μm, a=10 μm, the fluid is water, and the material for forming the passageway is Kapton, which is a registered trademark of E.I. Du Pont for a flexible film of electrically insulative material. Table 1 includes some of the information relevant to this determination.

TABLE 1

| Property | water | Kapton |
|---|---|---|
| $\rho$ (kg/m$^3$) | 997 | 1420 |
| k (W/m-K) | 0.608 | 0.12 |
| $C_p$ (J/kg-K) | 4177 | 1090 |

As can be seen, f reflects the percentage of the heat tracer propagation rate to the bulk fluid flow rate. The percentage is a function of a geometry ratio (i.e., w/a) and a heat capacity ratio.

Figure 9:
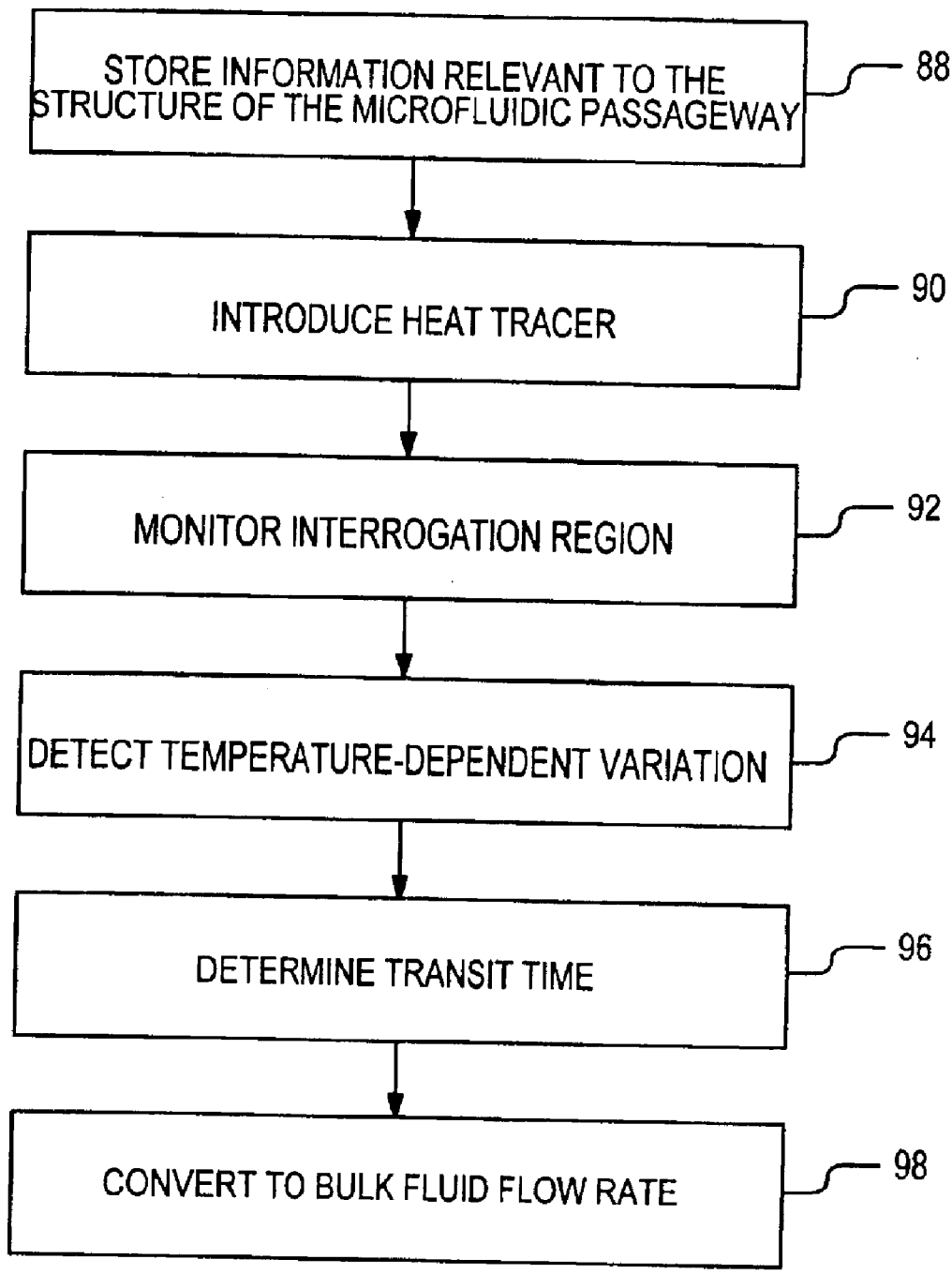
FIG. 9 is a process flow of steps for carrying out flow rate conversions in accordance with one embodiment of the invention.

FIG. 9 is a process flow of steps for executing the invention. At step 88, information relevant to determining flow rates for the microfluidic passageway is stored. Thus, the wall thickness, the passageway dimensions, and the specific materials that form the walls are relevant. Thus, a table may be stored so as to include the different scaling factors for a given structure and for a variety of fluids that might be used. Alternatively, an equation can be stored, where the equation results from a fit to numerical calculations that are performed as a function of the heat capacity of a fluid within the structure. As one possibility, the storage occurs within memory of the processor 32 of FIG. 1. Alternatively, the substrate 18 may have separate storage capacity, such as integrated read only memory (ROM). As another possibility, the information is stored off-chip for access when the conversion from heat tracer propagation information to bulk fluid flow information is implemented. The conversion may occur off-chip, but there are advantages to enabling all processing to take place at the chip level.

In some applications, there will only be a limited number of fluids that will be used in the analysis. For example, there may be only two fluids contemplated for use within the system of FIG. 1. Optionally, the structure that forms the microfluidic passageway 12 may be selected to be relatively neutral with respect to the selection of the fluids in a particular use. That is, the structure may be designed to minimize the heat partitioning effect such that the sensitivity to the type of fluid is low. This may simplify the processing.

At step 90, a heat tracer is introduced into the flow of fluid through the microfluidic passageway 12. Heat pulses may be applied to the narrow zone along the passageway through which fluid is flowing. A heat tracer may be introduced via a resistive heater element placed along the passageway or by means of propagating an electrical current directly through a narrow zone of fluid between two electrodes 20 and 22. Optical heating is also an option.

As the heated volume of fluid flows through the microfluidic passageway 12, the heat partitions into and out of the walls 78 and 80 which define the microfluidic passageway 12, as described with reference to FIG. 8. As a consequence, the heat tracer propagates at a slower rate than the bulk fluid flow rate. As indicated at step 92, the interrogation region is monitored to detect arrival of the heat tracer. The interrogation region is monitored to detect temperature-dependent variations of the fluid. Optical monitoring may occur by measuring the refractive index of the fluid. On the other hand, electrical conductivity may be monitored using either direct contact electrodes or "contactless" detection, as described in U.S. Pat. No. 6,386,050 to Yin et al.

At steps 94 and 96, the temperature-dependent variation within the interrogation region is detected and the transit time of the heat tracer over a known distance is determined. The known distance may be the distance between a heating zone and the interrogation region or between a pair of interrogation regions. Then, the conversion from the heat tracer propagation information to the bulk fluid flow information is performed at step 98.

The conversion to the bulk fluid flow rate may be performed directly from the transit time determined within step 96. As an alternative, the heat tracer propagation rate may be calculated and then used in the conversion process. The previously identified algorithm provides the basis for converting from the slower heat tracer propagation rate to the bulk fluid flow rate. As compared to an algorithmic conversion, the information stored at step 88 may include a calibration curve for converting measured heat tracer time intervals to known bulk fluid flow rates.

An advantage of the processing of FIG. 9 is that the flow rate differential has been recognized and a methodology has been incorporated to accurately determine the bulk fluid flow rate. Accurate calculations of flow rates are significant to some analytical processes.

What is claimed is:

1. A method of measuring on-chip fluid flow within a microfabricated device comprising:
   introducing a heat tracer into a fluid flowing within a passageway of said microfabricated device, including defining a start region for determining a propagation rate of said heat tracer within said passageway;
   monitoring a condition of said fluid during passage through an interrogation region;
   based on said monitoring, detecting when said heat tracer reaches said interrogation region, thereby acquiring information relevant to said propagation rate of said heat tracer from said start region to said interrogation region; and
   determining a bulk flow rate of said fluid through said passageway on a basis of said detecting and on a basis of an adjustment that is specific to a scaling between said bulk flow rate and said propagation rate of said heat tracer, said scaling being representative of a flow rate differential between said bulk flow rate and said propagation rate of said heat tracer.

2. The method of claim 1 further comprising calculating said adjustment using parameters specific to properties of said fluid and properties of structure of said microfabricated device directly related to forming said passageway.

3. The method of claim 2 wherein using said properties includes employing values for
   (a) heat capacities of said fluid and said structure directly related to forming said passageway;

(b) geometries of said passageway and said structure;

(c) density of said fluid; and (d) materials which define wells of said passageway.

4. The method of claim 3 wherein employing said values includes (a) determining a ratio of said heat capacity of said structure to a heat capacity of said fluid; and (b) determining a ratio of a cross sectional dimension of said passageway to a cross sectional dimension of said structure.

5. The method of claim 1 wherein said determining said bulk flow rate includes calculating said propagation rate of said heat tracer and applying an algorithm which is specific to compensating for said scaling between said propagation rate and said bulk flow rate.

6. The method of claim 1 wherein said determining said bulk flow rate includes calculating said propagation rate of said heat tracer and applying a calibration curve which implements an upward adjustment of said propagation rate.

7. The method of claim 1 wherein said introducing said heat tracer includes selectively activating on-chip circuitry of said microfabricated device.

8. The method of claim 1 wherein said monitoring includes providing on-chip determinations of one of electrical and optical properties of said fluid, where said properties vary with variations in temperature of said fluid.

9. The method of claim 8 wherein said monitoring further includes utilizing on-chip processing circuitry in detecting changes in said properties.

10. A system for monitoring flow comprising:

a substrate having integrated microfluidic features, including a microfluidic passageway having an entrance coupled to receive a flow of fluid;

a heat generator coupled to introduce heat tracers into said flow of fluid;

a detector positioned to detect temperature-dependent variations in said fluid along said microfluidic passageway, said detector having an output indicative of said temperature-dependent variations; and a processor connected to said detector to receive said output, said processor being configured to determine tracer propagation transit times of said heat tracers through said microfluidic passageway and to determine bulk fluid flow rates through said microfluidic passageway, said tracer propagation transit times being based on data that includes said output of said detector, said bulk fluid flow rates being based on said tracer propagation transit times and a pre-identified scaling between tracer propagation rates of said microfluidic passageway and said bulk fluid flow rates of said microfluidic passageway, said pre-defined scaling being representative of a differential in correlating said tracer propagation rates to said bulk fluid flow rates.

11. The system of claim 10 wherein said heat generator and said detector are integrated onto said substrate, said heater generator and said detector being microfabricated components.

12. The system of claim 10 wherein said processor is coupled to a storage of information specific to said scaling between said tracer flow and bulk fluid propagation rates of said microfluidic passageway.

13. The system of claim 12 wherein sold information includes a calibration curve that is representative of said scaling for various said tracer propagation rates.

14. The system of claim 12 wherein said information includes property data indicative of known properties and geometries of said microfluidic passageway and said fluid, said processor being configured to execute an algorithm that uses said property data to determine said bulk fluid flow rate.

15. The system of claim 14 wherein said processor is integrated onto said substrate.

16. A method of measuring on-chip fluid flow comprising:

providing a microfabricated system having microfluidic features integrated with electronic circuitry onto a substrate, said microfluidic features including a microfluidic passageway having an interrogation region;

storing passageway data indicative of passageway-related factors relevant to determining a difference between a speed of fluid through said microfluidic passageway and a propagation speed of a heat pulse of fluid through said microfluidic passageway;

storing fluid data indicative of fluid-related factors relevant to determining said difference;

inducing a flow of fluid through said microfluidic passageway;

introducing a heat pulse into said flow;

determining a propagation speed of said heat pulse within said microfluidic passageway; and converting said propagation speed of said heat pulse to a speed of said flow by using said passageway data and said fluid data.

17. The method of claim 16 wherein said storing passageway data includes determining information specific to the dimensions and materials of structure that forms said microfluidic passageway.

18. The method of claim 17 wherein said storing fluid data includes determining a heat capacity of said fluid.

19. The method of claim 16 wherein providing said microfabricated system includes integrating a heat generator and a heat pulse detector onto said substrate.

20. The method of claim 19 wherein integrating said heat generator includes embedding at least one thin film resistor into said substrate.

21. The method of claim 16 wherein introducing said heat pulse includes providing direct electrical heating of said fluid.

22. The method of claim 16 wherein introducing said heat pulse includes providing optical heating of said fluid.

23. The method of claim 16 wherein determining said propagation speed of said heat pulse includes monitoring conductivity of said fluid flowing through an interrogation region downstream of a start region at which said heat pulse is introduced.

24. The method of claim 16 wherein determining said propagation speed includes embedding a series of sensing features on said substrate and utilizing at least one said sensing feature to monitor properties of said fluid within an associated interrogation region of said microfluidic passageway, thereby providing a plurality of said interrogation regions.

* * * * *